March 26, 1940.  W. B. MORROW  2,194,866
HITCH COUPLER
Filed March 2, 1939  3 Sheets-Sheet 1
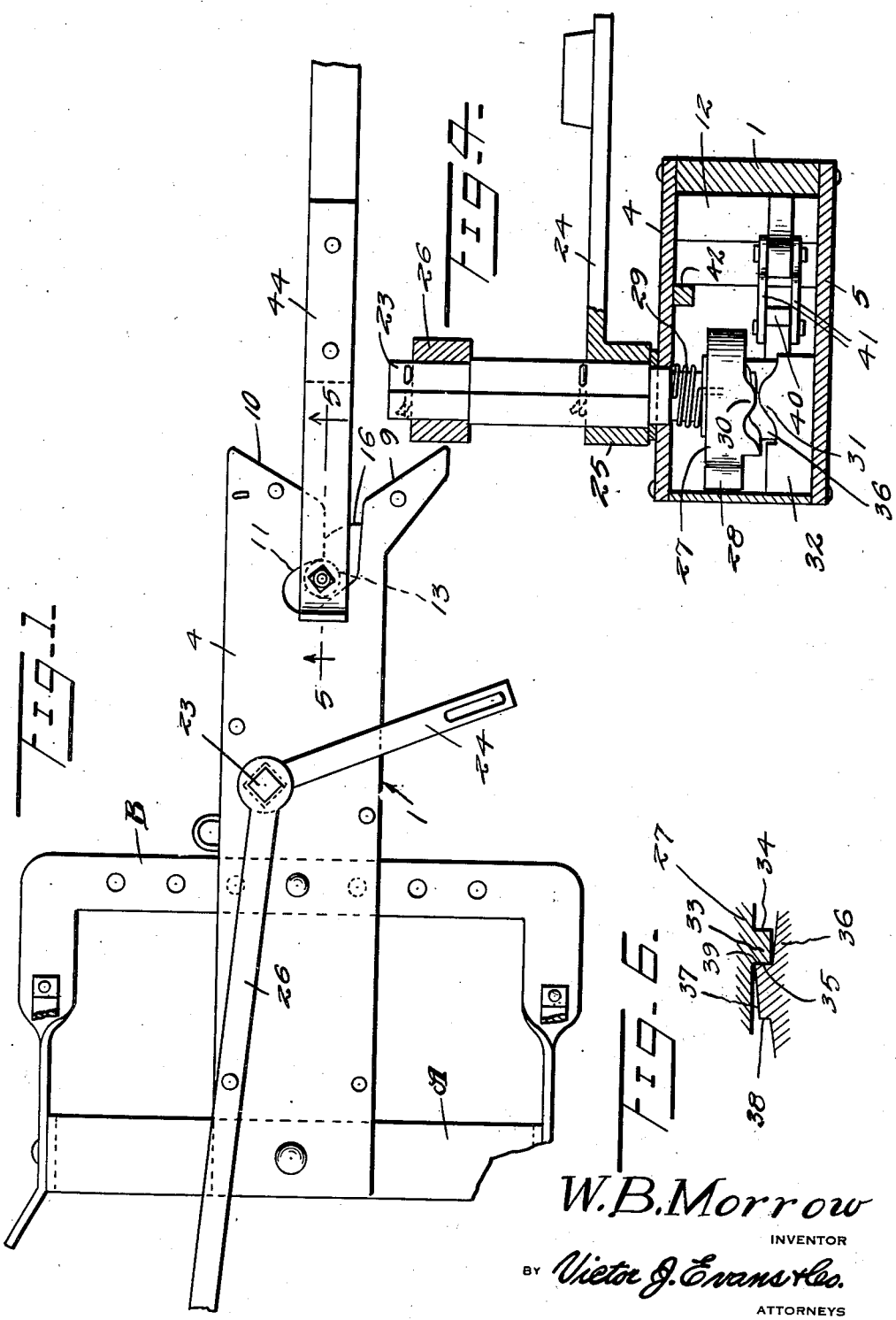
W.B. Morrow
INVENTOR
BY Victor J. Evans & Co.
ATTORNEYS

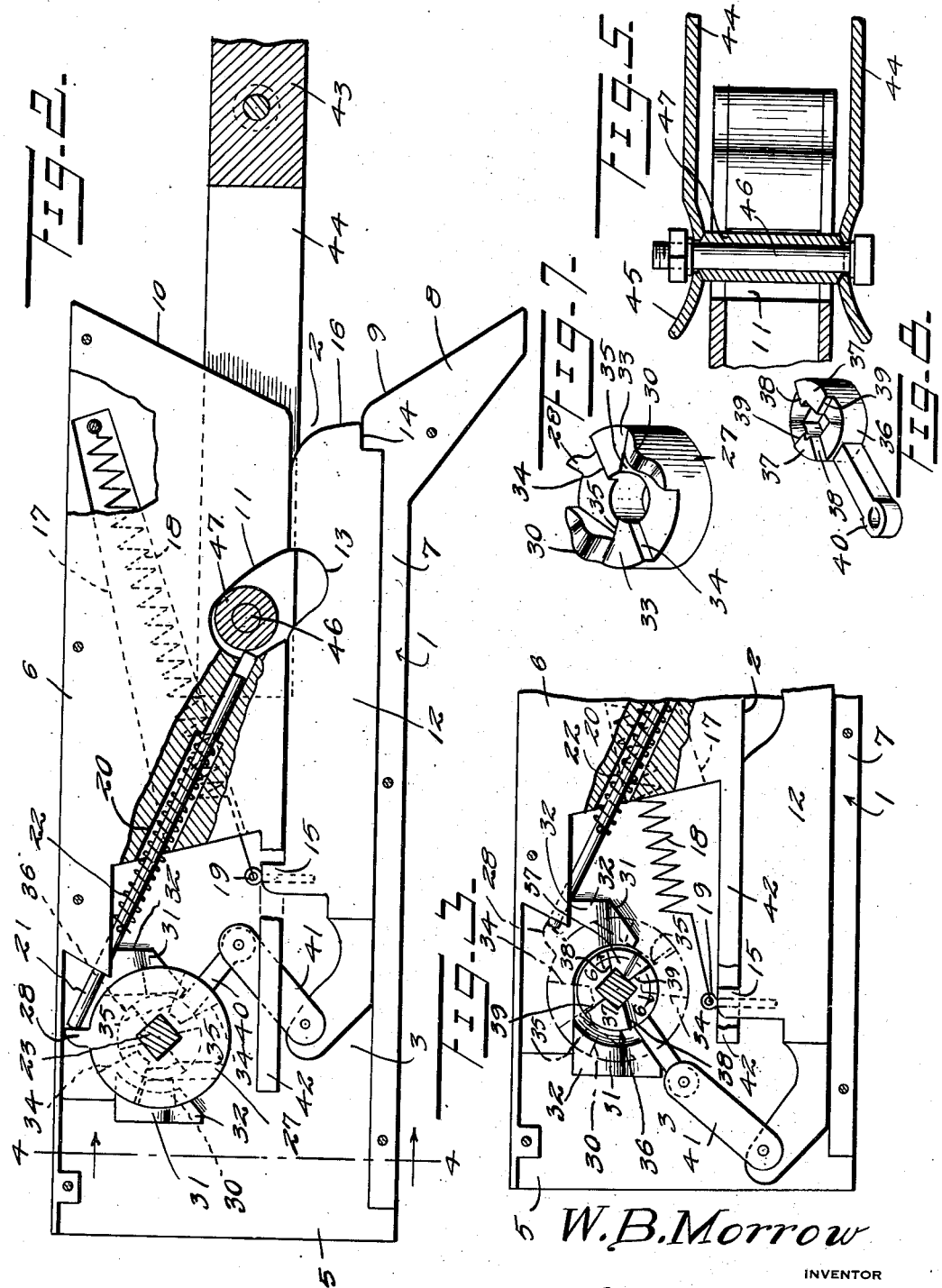

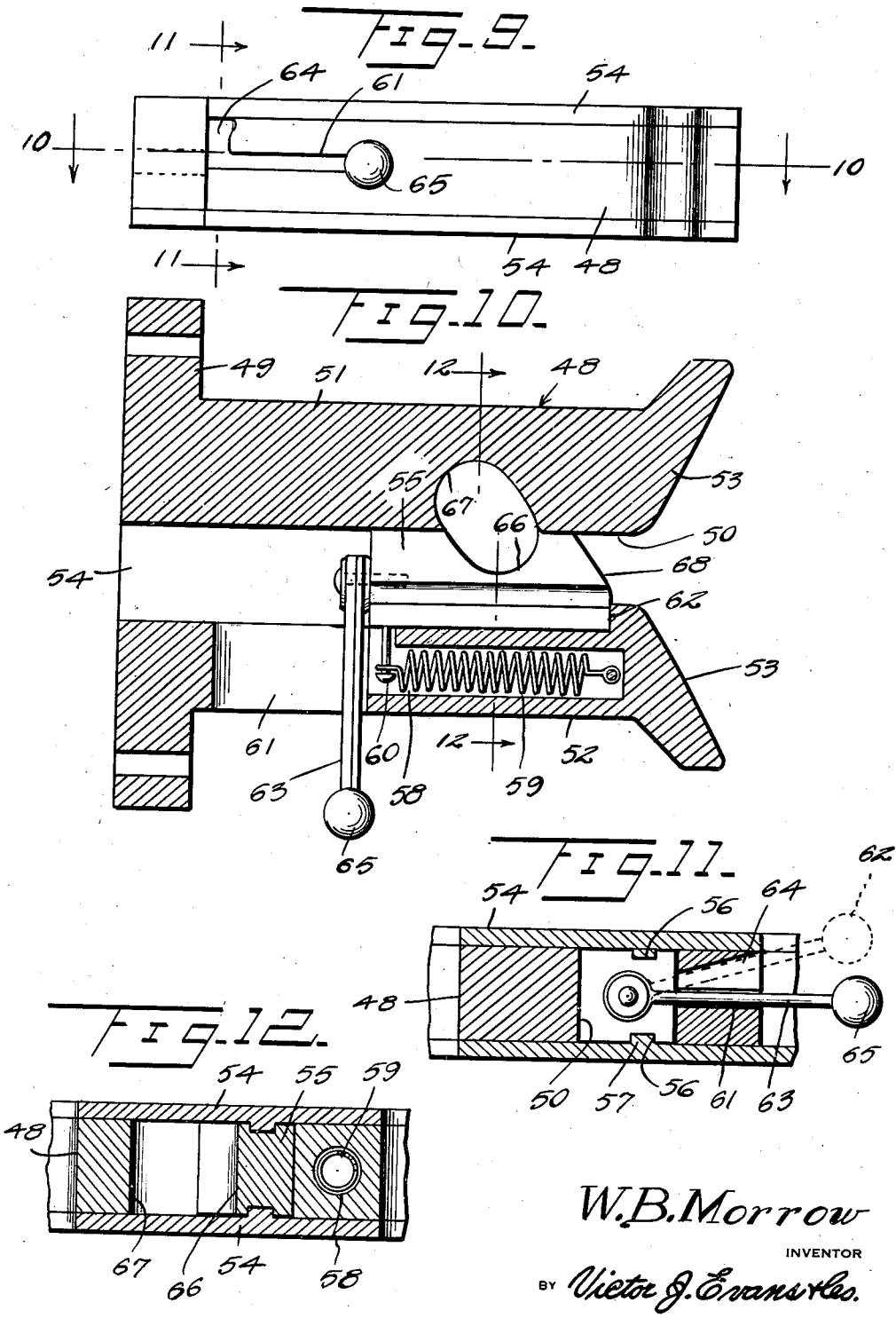

Patented Mar. 26, 1940

2,194,866

UNITED STATES PATENT OFFICE 2,194,866

HITCH COUPLER

William B. Morrow, Newburg, Pa.

Application March 2, 1939, Serial No. 259,464

4 Claims. (Cl. 280—33.15)

This invention relates to hitch couplers, and its general object is to provide an automatic coupler that is primarily designed for use with tractors for connecting farm implements, thrashing machines, wagons and the like thereto for pulling and pushing the same, the coupler being fully automatic in its coupling action, and can be moved to uncoupled position from the operator's seat of the tractor, for releasing the implement et cetera, in an easy and expeditious manner and with minimum effort on the part of the operator, with the result it will be seen that my coupler not only materially saves time, and is extremely convenient to use, but prevents accidents in that the necessity of the operator leaving the tractor and standing between the latter and the implement to couple and uncouple the same, is eliminated.

A further object is to provide a hitch coupler of the character set forth, that includes a drawhead having outwardly flared outer end portions providing guides for directing the tongue into coupled position, and when so arranged, is locked accordingly against any possibility of becoming casually uncoupled under any circumstances.

Another object is to provide a hitch coupler that can be applied to any type of tractor and trailing implement, thrashing machine, wagon or the like, and is simple in construction, inexpensive to manufacture, and extremely efficient in operation, use and service.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:

Figure 1 is a top plan view of one form of my hitch coupler.

Figure 2 is a view partly in section with the top plate of the drawhead removed and the parts arranged to allow the latch bar to be manually moved to unlocked or uncoupled position.

Figure 3 is a similar fragmentary view illustrating the arrangement of the parts when the latch bar is in its unlatched position and held accordingly.

Figure 4 is a transverse sectional view taken approximately on line 4—4 of Figure 2, looking in the direction of the arrows, but with the cover plate applied and illustrating the operating shaft and handles therefor.

Figure 5 is a sectional view taken approximately on line 5—5 of Figure 1, looking in the direction of the arrows.

Figure 6 is a sectional view taken approximately on line 6—6 of Figure 3, looking in the direction of the arrows.

Figure 7 is a perspective view of the cam and ratchet disk which forms a part of the present invention.

Figure 8 is a similar view of the companion or arm carrying ratchet disk.

Figure 9 is a side elevation of a modified form of coupler unit to be secured to the tractor.

Figure 10 is a sectional view taken approximately on line 10—10 of Figure 9, looking in the direction of the arrows.

Figure 11 is a sectional view taken approximately on line 11—11 of Figure 9, looking in the direction of the arrows.

Figure 12 is a sectional view taken approximately on line 12—12 of Figure 10, looking in the direction of the arrows.

Referring to the drawings in detail, and particularly to the form of Figures 1 to 8 inclusive, it will be noted that the letter A indicates the usual transverse pull bar of a tractor and B the draw bar frame on which is mounted the drawhead of my hitch coupler, and the drawhead is pivoted at its forward end to the pull bar in the usual manner, the drawhead being of elongated formation and of a length to extend a considerable distance beyond the frame, as shown.

The drawhead includes an elongated relatively flat body 1 that is slotted longitudinally adjacent one side thereof as at 2, from its rear end and the opposite or inner end of the slot communicates with a hollow inner portion providing a chamber 3 which may open through the inner end of the drawhead as shown, but the chamber as well as the slot is closed by upper and lower plates 4 and 5 respectively, as best shown in Figure 4. The lower plate may be welded, formed on or otherwise fixed to the body but the upper plate is removable and secured to the body by screw bolts.

The solid portion 6 of the body and which is provided by the lateral arrangement of the slot inclines outwardly from the slot at its rear end, and formed on the rear end of the narrow portion 7 is an outwardly flared extension 8 which has an inclined wall 9 opposed to the inclined rear end wall 10 of the portion 6, so that the walls are disposed in converging relation toward the slot to provide guiding means for the pull pin of the tongue which will be later described.

The solid portion 6 is provided with a forwardly inclined notch 11 opening into the slot 2 adjacent the rear end thereof, and mounted in the slot for slidable movement is a latch bar 12 having a notch 13 arranged for registration with the notch 11, when the latch bar is in its latched position, as best shown in Figure 2, which likewise illustrates that the latch bar is limited in its movement to latching position by abutment or stop means 14 formed on the rear end of the bar 12 and the inner end of the extension 8, as well as by a lug 15 extending laterally from the inner end of the bar 12, for engagement with the inner wall of the chamber 3, and the outer or rear end of the bar 12 is curved inwardly to provide a cam surface 16, to facilitate the inward movement of the bar by the pull pin and the movement of the latter within the notch 11, as and for a purpose which will be later described.

Extending diagonally through the solid portion 6 is a bore 17 that has arranged therein a coil spring 18 having one end anchored at the inner end of the bore, while its opposite end is secured to an eyed pin 19 fixed to the inner end of the bar 12, to urge and hold the latter in its latched position, as will be apparent. Extending diagonally through the solid portion in an opposed direction from that of the bore 17 is a bore 20 that opens into the notch 11 at one end, and the chamber 3 at its opposite end, and mounted for slidable movement in the bore 20 is a plunger rod 21 that is urged toward the chamber by a coil spring 22, but is of a length to have one end extend into the notch 11 at certain times during the operation of the coupler to be engaged by the pull pin of the tongue, as shown in Figure 2.

Mounted for rotation in the upper and lower plates 4 and 5 is a vertically arranged operating shaft 23 that extends through the chamber and the outer portion thereof has detachably secured thereto adjacent to the drawhead, a short handle 24, through the medium of a collar 25 which together with the outer portion of the shaft is square cornered, as best shown in Figure 4. Detachably secured to the reduced outer end of the shaft is a long handle 26 that extends to and terminates adjacent to the operator's seat of the tractor, so that the shaft can be conveniently operated accordingly, as will be apparent.

The inner portion of the operating shaft is reduced in stepped formation from its connection with the upper plate and to the lower plate, and rotatably mounted on an intermediate rounded stepped portion is a disk 27 having a lug or tooth 28 formed on and extending from its periphery, the tooth having a flat surface arranged in the path of the rod 21 that acts to move the disk at certain times during the operation of the coupler and the tooth moves the rod at other times. The disk 27 is not only rotatably mounted on the rounded bearing portion of the shaft, to be moved accordingly by the rod, but is vertically movable thereon and is also rotated and urged downwardly by a coil spring 29 that has one end fixed to the shaft, and its opposite end fixed to the disk, as best shown in Figure 4. The under surface of the disk is provided with depending rounded projections 30 disposed diametrically opposite each other and which provide cam surfaces for cooperation with raised and rounded cam surfaces 31 on blocks 32 that are fixed to the lower plate 5, for raising the disk against the action of the spring 29. The disk also has ratchet teeth 33 formed on its lower surface to provide diametrically opposed shoulders 34 and 35, as best shown in Figure 7. Mounted on a squared stepped portion just below the said intermediate rounded portion that has the disk 27 mounted thereon, is a small or companion disk 36 of a diameter to fit between the cam surfaces 30 and formed on and rising from the small disk are ratchet teeth 37 providing shoulders 38 and 39 which are engageable with the shoulders 34 and 35 respectively. Formed on and extending from the periphery of the disk 36 is an arm 40 which has one of the ends of links 41 pivotally secured thereto, while the opposite ends of the links are pivotally secured to the reduced inner end of the latch bar 12 that is not only guided in the slot 2, but also by a strip 42 extending from the solid portion 6, within the chamber, as shown in Figures 2 and 3.

The tongue which is to be secured to the trailing implement, wagon or the like, is best shown in Figures 2 and 5, and includes a solid body portion 43 having secured to the opposite sides of the outer ends thereof strap irons 44 which terminate at their outer ends in outwardly flared arcuate portions 45 and bridging the arcuate portions is the pull pin previously referred to. The pull pin is made up of a headed bolt 46 and a nut therefor, with a sleeve 47 surrounding the bolt, the sleeve having beveled ends countersunk in the bolt openings in the strap irons, as best shown in Figure 5.

From the above description and the disclosure in Figures 1 to 8 inclusive of the drawings, it is believed that it will be obvious that when it is desired to couple an implement or the like to a tractor having my coupling hitch unit attached thereto, that the tractor is moved until the pull pin of the tongue engages the latch bar, and pushes the latter inwardly until the pin reaches the notch 11. When the pin reaches the notch, the latch bar has moved back a sufficient distance to move the small disk through the medium of the links 41 and arms 40 so that the shoulders 39 of the ratchet teeth 37 of the disk 36 engages the shoulders 35 of the teeth 33 of the disk 27, as best shown in Figure 6, for moving the disk 27 to the position of Figure 3, for the lug 28, to push the rod 21 against the action of its spring into the notch 11, and at the same time the pivot pin of the arm 40 is moved beyond dead center by the inertia of the parts, at the pivot point for engagement of the arm with the adjacent block 32 that acts as an abutment therefor, as clearly shown in Figure 3, with the result the bar 12 is held in uncoupled or unlatched position. It will be obvious that the pivots which connect the links 41 to the arm 40 and the latch bar are loose to allow free movement of the parts. The spring 22 has only sufficient tension to barely urge the bar 21 toward the chamber 3 for disposal in the path of the lug 28, and the spring 29 is constantly urging the lug 28 in the direction of the rod 21, therefore the spring 22 will have no effect on the inertia of the links and arm 40 in retarding the movement of the pivot pin of the arm beyond dead center, as shown in Figure 3. Further inward movement of the pull pin will result in it being positioned within the notch 11 to engage the rod 21 to cause the latter to push upon the lug 28 to reverse the movement of the disk 27 to cause the shoulders 34 to engage the shoulders 38 of the disk 36 to move the pivot point of the arm back from its dead center position to allow the spring 18 to snap the bar to latched or coupled position, and when in said position the notch 13 is disposed in registration with the notch 11 to enclose the pull pin therein to couple the tongue with the drawhead.

When it is desired to uncouple it is necessary to back the tractor for disposing the pull pin within the notch 11, so that the bar 12 can be moved to unlatched position, and in so doing, the plunger rod 21 is pushed against the tooth or lug of the disk 27 to move the latter, so that the cam surfaces 30 ride up upon the cam surfaces 31 to move the shoulders of the disk 27 out of engagement with the shoulders of the disk 36 to allow the shaft to be manually turned. One of the handles is then operated to rotate the shaft to move the bar to its unlatched position with the pivot pin of the arm 40 past dead center, and when the pull pin is moved out of the notch 11, the disk 27 is rotated by the spring 29 which has a much greater tension than that of the spring 22, to cause the lug or tooth 28 to move the rod into the notch 11, so that the parts are in a position to perform a coupling operation.

While it has been stated that the pull pin pushes the latch bar inwardly to perform a coupling function, the latch bar can be manually moved and held in its inner or unlatched position prior to movement of the pull pin in the slot 2, and when the pull pin reaches and engages the rod 21, the latch bar will be released and moved to latched position as and for the purpose previously set forth.

From the foregoing, it will be seen that the handle 26 is for the purpose of operating the shaft 23 from the operator's seat of the tractor, but it might be mentioned that the shaft can be operated from the ground if desired and when the occasion arises, and in that event the handle 24 is used.

In Figures 9 to 12 inclusive I have illustrated a modified form of coupling unit to be attached to a tractor and this form is primarily designed for use for pushing implements, thrashing machines, wagons and the like and of course it can be used for pulling the same, as will be apparent.

In any event the drawhead of the form of Figures 9 to 12 inclusive is shorter than the drawhead of the other form and includes a body 48 having a flat inner end, with attaching ears 49 extending laterally from opposite sides thereof to receive screw bolts in the openings for fixing the draw bar to the tractor to extend forwardly or rearwardly therefrom, as the case may be, and the body is slotted longitudinally throughout its length as at 50, to receive the pull pin of the tongue which is similar to that illustrated and described for the other form.

The slot 50 divides the body into separate portions or sections 51 and 52 respectively, and each portion has an outwardly flared projection 43 formed on the outer ends thereof to provide walls converging toward the slot 50 to guide the pull pin therein. Secured to the body 48 are upper and lower plates 54 and the upper plate may be removable, while the lower plate may be welded or otherwise fixed to the body, but of course may likewise be removable.

Mounted for slidable movement in the slot 50 is a latch bar 55 having grooves 56 extending longitudinally adjacent one side thereof, to receive tongues 57 formed on the upper and lower plates to guide the latch bar in its movement. The portion 52 has a chamber 58 therein within which is disposed a coil spring 59 having one end anchored at the inner end of the chamber, and its opposite end is secured to a pin 60 fixed on the latch bar and extending into a slot 61 in the portion 52. It will be obvious that the spring 59 urges and holds the latch bar 55 in its latched position, and a shoulder 62 is formed on the inner wall of the slot 59 at the outer end thereof to provide a stop or abutment for the latch bar to limit its movement to latched position, as clearly shown in Figure 10.

Pivotally secured to the inner end of the latch bar is an operating lever 63 providing a handle therefor to manually move the bar to unlatched position and the bar is held accordingly by the handle being received in a recess 64 arranged at the inner end of the slot 61, as best shown in Figure 9. The handle has a knob 65 on the outer end thereof, and the knob is preferably weighted to facilitate the use of the handle.

The latch bar 55 is provided with a notch 66 to register with a notch 67 in the portion 51 to receive the pull pin, as will be apparent upon inspection of Figure 10, and the outer end of the latch bar is beveled as at 68 to provide a cam surface to direct the pull pin within the notch 67.

It is believed that the operation of the form of Figures 9 to 12 inclusive will be obvious from the foregoing and disclosure in the drawings, therefore description in that respect is deemed unnecessary.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. A hitch coupler comprising a tongue including a pull pin, a coupling unit including a drawhead having a slot extending longitudinally therein, a spring pulled latch bar slidably mounted in the slot and urged and normally held in latched position, said latch bar and drawhead each having a notch therein to receive the pull pin and the notches being arranged in registration when the latch bar is in latched position for enclosing the pull pin to couple the tongue to the drawhead, means for moving and holding the latch bar in unlatched position, and means for releasing the latch bar from its unlatched position and being automatically operable by the pull pin.

2. A hitch coupler comprising a tongue including a pull pin, a coupling unit including a drawhead having a slot extending longitudinally therein, a spring pulled latch bar slidably mounted in the slot and urged and normally held in latched position, said latch bar and drawhead each having an inclined notch therein to receive the pull pin and the notches being arranged in registration when the latch bar is in latched position for enclosing the pull pin to couple the tongue to the drawhead, said latch bar being movable to unlatched position by the pull pin, manually actuated means for moving and holding the latch bar in unlatched position, and automatic means for operating the holding means for releasing the latch bar from unlatched position and including means movable into the notch of the drawhead for engagement by the pull pin.

3. A hitch coupler comprising a tongue including a pull pin, a coupling unit including a drawhead having a slot extending longitudinally therein, means for connecting the drawhead to a tractor, a spring pulled latch bar slidably mounted in the slot and urged and normally held in latched position, said latch bar and drawhead each having a notch therein to receive the pull pin and the notches being arranged in registration when the latch bar is in latched position for enclosing the pull pin to couple the tongue to the drawhead, said latch bar being movable to unlatched position by the pull pin, manually actuated cam and ratchet means for moving and holding the latch bar in unlatched position, a spring pressed rod for operating the holding means for releasing the latch bar from unlatched position and movable into the notch of the draw bar by the cam and ratchet means for engagement by the pull pin, and means for operating the manually actuated means from the driver's seat of the tractor.

4. A hitch coupler comprising a tongue including a pull pin, a coupling unit including a drawhead having a slot extending longitudinally therein, means for connecting the drawhead to a tractor, a spring pulled latch bar slidably mounted in the slot and urged and normally held in latched position, said latch bar and drawhead each having a notch therein to receive the pull pin and the notches being arranged in registration when the latch bar is in latched position for enclosing the pull pin to couple the tongue to the drawhead, said latch bar being movable to unlatched position by the pull pin, manually actuated cam and ratchet means for moving and holding the latch bar in unlatched position, a spring pressed rod for operating the holding means for releasing the latch bar from unlatched position and movable into the notch of the draw bar by the cam and ratchet means for engagement by the pull pin, means for operating the manually actuated means from the driver's seat of the tractor, means for guiding the pull pin in the slot and means for directing the pull pin in the notch of the drawhead.

WILLIAM B. MORROW.